(12) United States Patent
Johnston et al.

(10) Patent No.: US 12,042,680 B2
(45) Date of Patent: Jul. 23, 2024

(54) ELECTRICAL CONTROL SYSTEMS FOR POWERED AIR-PURIFYING RESPIRATORS

(71) Applicant: FORD GLOBAL TECHNOLOGIES, LLC, Dearborn, MI (US)

(72) Inventors: William Stewart Johnston, South Lyon, MI (US); Sheran Alles, Livonia, MI (US); Eric Robert Krieger, Canton, MI (US); Mario Domonick Iaquinta, Brighton, MI (US); Jonathan Franklin Iaquinto, Flat Rock, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 820 days.

(21) Appl. No.: 16/987,699

(22) Filed: Aug. 7, 2020

(65) Prior Publication Data

US 2022/0040504 A1 Feb. 10, 2022

(51) Int. Cl.
| | |
|---|---|
| A62B 9/00 | (2006.01) |
| A62B 7/00 | (2006.01) |
| A62B 7/10 | (2006.01) |
| A62B 18/00 | (2006.01) |
| A62B 18/04 | (2006.01) |
| A62B 18/08 | (2006.01) |
| H02P 7/29 | (2016.01) |
| H02P 7/292 | (2016.01) |

(52) U.S. Cl.
CPC .................. *A62B 9/00* (2013.01); *A62B 7/10* (2013.01); *A62B 9/006* (2013.01); *A62B 18/006* (2013.01); *A62B 18/04* (2013.01); *A62B 18/08* (2013.01); *H02P 7/29* (2013.01); *H02P 7/292* (2013.01)

(58) Field of Classification Search
CPC .. A62B 9/00; A62B 7/10; A62B 9/006; A62B 18/006; A62B 18/04; A62B 18/08; H02P 7/29; H02P 7/292
See application file for complete search history.

(56) References Cited

U.S. PATENT DOCUMENTS

| | | | | |
|---|---|---|---|---|
| 5,671,730 | A | * | 9/1997 | Ollila ................... G05D 7/0676 128/205.27 |
| 5,906,203 | A | * | 5/1999 | Klockseth ............ A62B 18/006 128/205.12 |
| 9,808,656 | B2 | * | 11/2017 | Vinnakota .............. A62B 9/006 |

(Continued)

FOREIGN PATENT DOCUMENTS

| | | | | |
|---|---|---|---|---|
| CN | 110665138 | A | * 1/2020 | ............. A62B 18/02 |
| GB | 2338655 | A | * 12/1999 | ........... A62B 18/006 |

OTHER PUBLICATIONS

English translation for CN 110665138, translated by espacenet.com, translated on Feb. 6, 2023.*

*Primary Examiner* — Tu A Vo
(74) *Attorney, Agent, or Firm* — David B. Kelley; Carlson, Gaskey & Olds, P.C.

(57) ABSTRACT

Electrical control and power supply systems are provided for powered air-purifying respirators (PAPRs). An exemplary electrical control system for a PAPR may be adapted to control the supply of power between a battery and a blower motor of a filtration unit of the PAPR. The electrical control system may include a plurality of integrated circuits that are capable of meeting minimum operating times while balancing power usage of various "off-the-shelf" components of the filtration unit.

19 Claims, 3 Drawing Sheets

(56) References Cited

U.S. PATENT DOCUMENTS

| | | | |
|---|---|---|---|
| 10,939,712 B1* | 3/2021 | McBride | A61M 21/0094 |
| 2003/0102699 A1* | 6/2003 | Aoki | B60H 1/00285 |
| | | | 297/180.13 |
| 2006/0165392 A1* | 7/2006 | Kanamori | B60H 1/00457 |
| | | | 388/804 |
| 2008/0127979 A1* | 6/2008 | Becker | A62B 18/006 |
| | | | 128/205.27 |
| 2009/0055987 A1* | 3/2009 | Becker | A61F 9/068 |
| | | | 2/209.13 |
| 2009/0266361 A1* | 10/2009 | Bilger | A62B 18/006 |
| | | | 128/204.21 |
| 2012/0266873 A1* | 10/2012 | Lalonde | A61M 16/0063 |
| | | | 128/205.24 |
| 2017/0094446 A1* | 3/2017 | Maggiore | H04W 4/80 |
| 2018/0028846 A1* | 2/2018 | Hur | A62B 17/04 |
| 2022/0001220 A1* | 1/2022 | McLaughlin | G01R 33/02 |

* cited by examiner

ELECTRICAL CONTROL SYSTEMS FOR POWERED AIR-PURIFYING RESPIRATORS

TECHNICAL FIELD

This disclosure relates generally to powered air-purifying respirators (PAPRs), and more particularly to electrical control systems for PAPRs.

BACKGROUND

A powered air-purifying respirator (PAPR) is a type of personal protective equipment. A PAPR can include a blower that forces air through filter cartridges or canisters and into a breathing zone of a wearer. This provides the wearer with a filtered airflow inside, for example, a tight-fitting facepiece or loose-fitting hood or helmet. A PAPR can protect the wearer from breathing in unwanted particulates, gases, and/or vapors.

SUMMARY

A powered air-purifying respirator (PAPR) assembly according to an exemplary aspect of the present disclosure includes, among other things, a battery, a blower assembly including a blower motor powered by the battery, and a DC-DC converter circuit configured to modify an input voltage from the battery to an output voltage that is compatible with the blower motor.

In a further non-limiting embodiment of the foregoing PAPR assembly, the DC-DC converter circuit is a step-down buck converter circuit configured to reduce the input voltage.

In a further non-limiting embodiment of either of the foregoing PAPR assemblies, the DC-DC converter is a step-up boost converter configured to increase the input voltage.

In a further non-limiting embodiment of any of the foregoing PAPR assemblies, the assembly includes an analog motor control circuit and a pulse width modulation (PWM) motor control circuit. A speed of the blower motor is controlled by either the analog motor control circuit or the PWM motor control circuit.

In a further non-limiting embodiment of any of the foregoing PAPR assemblies, the analog motor control circuit and the PWM motor control circuit are discrete integrated circuits of a printed circuit board of a filtration unit of the PAPR assembly.

In a further non-limiting embodiment of any of the foregoing PAPR assemblies, the assembly includes a battery alarm circuit adapted to monitor the input voltage from the battery.

In a further non-limiting embodiment of any of the foregoing PAPR assemblies, the battery alarm circuit includes a sound generating device that is actuated in response to the input voltage falling below a predefined battery low voltage threshold.

In a further non-limiting embodiment of any of the foregoing PAPR assemblies, the assembly includes a battery protection circuit configured to automatically shut-off the blower motor when the input voltage of the battery falls below a predefined battery voltage shutoff threshold.

In a further non-limiting embodiment of any of the foregoing PAPR assemblies, the predefined battery voltage shutoff threshold is a different, lower voltage than the predefined battery low voltage threshold.

In a further non-limiting embodiment of any of the foregoing PAPR assemblies, the assembly includes a current monitoring circuit configured to monitor a current draw of the blower motor.

In a further non-limiting embodiment of any of the foregoing PAPR assemblies, the assembly includes a motor calibration circuit configured for adjusting an airflow setting of the PAPR assembly.

In a further non-limiting embodiment of any of the foregoing PAPR assemblies, the assembly includes a faraday cage positioned over the DC-DC converter circuit.

In a further non-limiting embodiment of any of the foregoing PAPR assemblies, the assembly includes a control unit programmed for controlling the output voltage applied to the blower motor from the DC-DC converter circuit.

In a further non-limiting embodiment of any of the foregoing PAPR assemblies, the battery is a retail grade rechargeable lithium-ion battery, and the blower assembly is a repurposed automotive component.

In a further non-limiting embodiment of any of the foregoing PAPR assemblies, the repurposed automotive component is a seat blower motor assembly for a heated/cooled vehicle interior seat.

A powered air-purifying respirator (PAPR) assembly according to another exemplary aspect of the present disclosure includes, among other things, a filtration unit housing, an electrical control system housed within the filtration unit housing and including an analog motor control circuit and a pulse width modulation (PWM) motor control circuit, and a blower assembly including a blower motor housed within the filtration unit housing. A speed of the blower motor is controlled by either the analog motor control circuit or the PWM motor control circuit.

In a further non-limiting embodiment of the foregoing PAPR assembly, the assembly includes a facepiece system connected to the filtration unit housing by a tube.

In a further non-limiting embodiment of either of the foregoing PAPR assemblies, the electrical control system includes a DC-DC converter circuit configured to modify an input voltage from a battery to an output voltage that is compatible with the blower motor.

In a further non-limiting embodiment of any of the foregoing PAPR assemblies, the electrical control system includes a battery alarm circuit having a sound generating device that is actuated in response to an input voltage of a battery falling below a predefined battery low voltage threshold.

In a further non-limiting embodiment of any of the foregoing PAPR assemblies, the electrical control system includes a control unit programmed to control the analog motor control circuit or the PWM motor control circuit for controlling the speed of the blower motor.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes electrical control and power supply systems for powered air-purifying respirators (PAPRs). An exemplary electrical control system for a PAPR may be adapted to control the supply of power between a battery and a blower motor of a filtration unit of the PAPR. The electrical control system may include a plurality of integrated circuits that are capable of meeting minimum device operating times while balancing power usage of various "off-the-shelf" components of the filtration unit. These and other features are discussed in greater detail in the following paragraphs of this detailed description.

Figure 1:
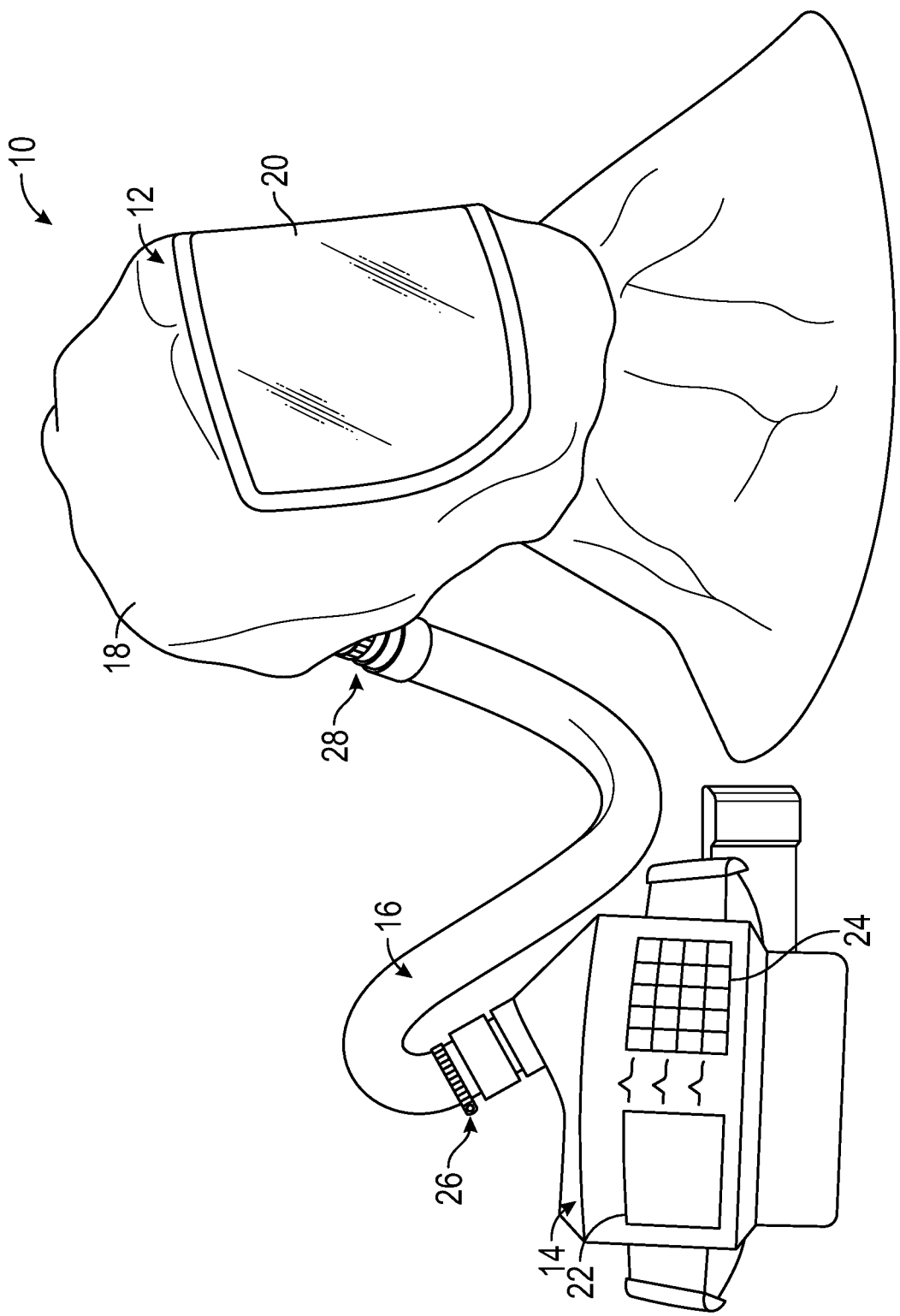
FIG. 1 illustrates a perspective and partially schematic view of a powered air-purifying respirator (PAPR).

FIG. 1 illustrates an exemplary PAPR assembly 10. The PAPR assembly 10 may be used as a type of personal protection equipment for protecting a user from breathing in unwanted particulates, gases, and/or vapors. The PAPR assembly 10 may include a facepiece system 12, a filtration unit 14, and a tube 16.

In an embodiment, the facepiece system 12 includes a hood 18 and a mask 20. When a user is wearing the PAPR assembly 10, the facepiece system 12 fits over a head of the user, and the filtration unit 14 may be secured about the waist of the user, for example.

As schematically shown in FIG. 1, the filtration unit 14 includes a blower assembly 22 and at least one filter 24. The blower assembly 22 is configured to force air through the filter 24 and into the tube 16. The filter 24 filters the air.

The tube 16 extends between the facepiece system 12 and the filtration unit 14 and is configured to deliver filtered air from the filtration unit 14 to the facepiece system 12. The filtered air moves from the tube 16 into a breathing zone of the user. The breathing zone is beneath the facepiece system 12. The user can thus breathe air filtered by the filter 24 of the filtration unit 14.

The tube 16 may extend from a first end portion 26 to a second end portion 28. In an embodiment, the first end portion 26 is connectable to the filtration unit 14, and the second end portion 28 is connectable to the facepiece system 12. The first end portion 26 and the second end portion 28 may be secured to the filtration unit 14 and the facepiece system 12, respectively, using pipe clamps or any other suitable fastening devices.

Figure 2:
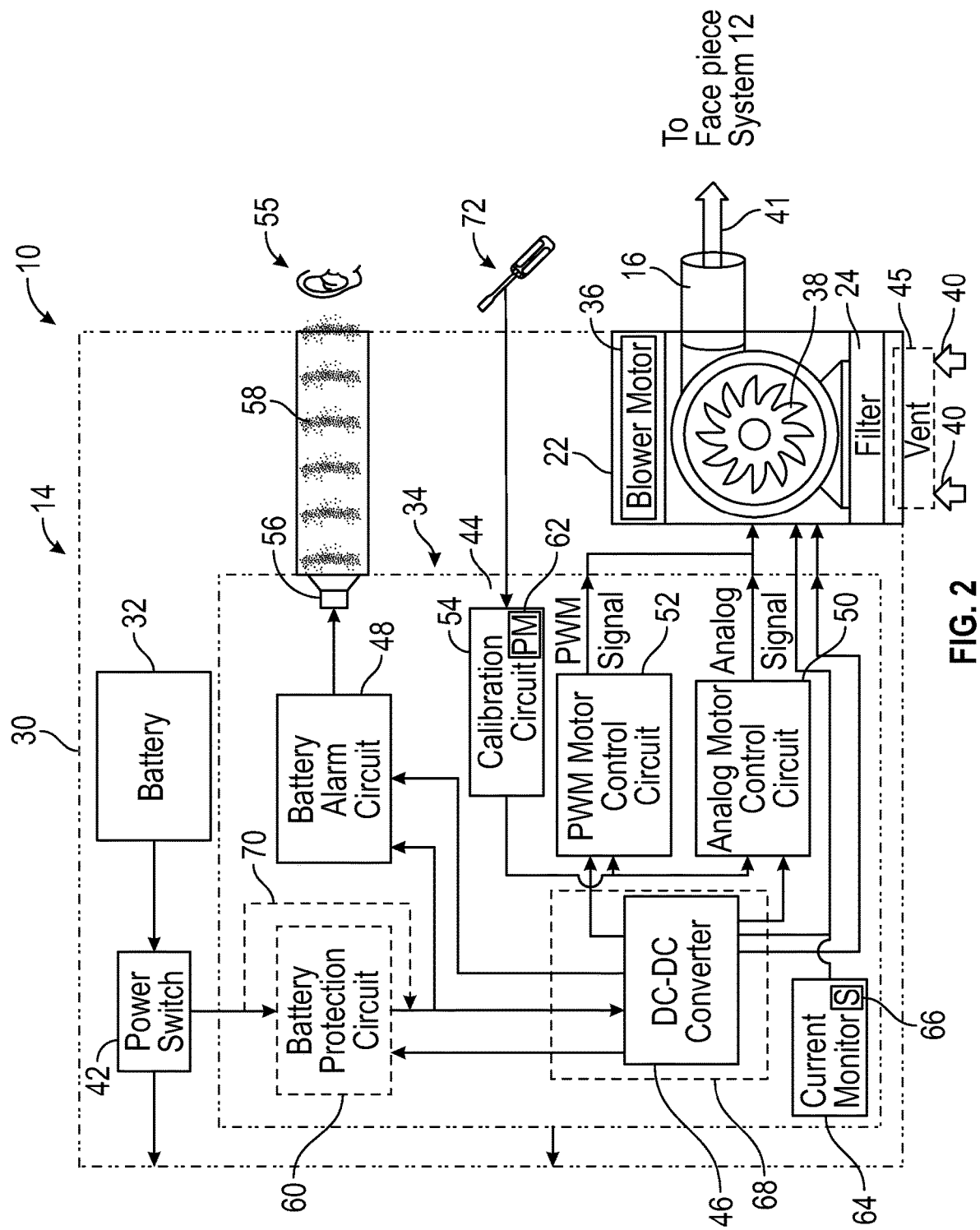
FIG. 2 is a block diagram of an electrical control system of a PAPR according to a first exemplary embodiment of this disclosure.

FIG. 2 is a block diagram that schematically depicts an exemplary filtration unit 14 for a PAPR assembly, such as the PAPR assembly 10 of FIG. 1, for example. The filtration unit 14 may include a housing 30 that houses a plurality of internal components, including but not limited to, a battery 32, a blower assembly 22, at least one filter 24, and an electrical control system 34 adapted for controlling various operations of the filtration unit 14.

The battery 32 may be a rechargeable battery that is removable from the housing 30 and replaceable with another battery. In an embodiment, the battery 32 is an off-the-shelf, retail grade battery that is available for purchase as a stock item from most hardware or home improvement places of business. In another embodiment, the battery 32 is a 20 V lithium-ion battery. However, the particular chemistry and voltage of the battery 32 are not intended to limit this disclosure.

The blower assembly 22 may include a blower motor 36 and a blower fan 38. The blower motor 36 may be operably connected to the battery 32 via the electrical control system 34. During operation of the PAPR assembly 10, the blower motor 36 may power the blower fan 38 to draw ambient air 40 through the housing 30 (e.g., through a vent 45 of the housing 30) and then through the filter 24. A filtered airflow 41 may then be communicated into the tube 16 for delivering a desired level of filtered airflow 41 inside the facepiece system 12.

In an embodiment, the blower assembly 22 is an automotive component that has been repurposed for use within the filtration unit 14 in order to enable the rapid production of the PAPR assembly 10. The blower assembly 22 could be any off-the-shelf automotive component that incorporates an electric motor and a fan/impeller. One non-limiting example of an off-the-shelf automotive component that is suitable for use as the blower assembly 22 is an automotive grade seat blower motor assembly such as used in heated/cooled vehicle interior seats.

The electrical control system 34 is adapted to control the supply of power between the battery 32 and the blower motor 36 when a power switch 42 of the filtration unit 14 is moved from an OFF position to an ON position. The power switch 42 therefore operably connects the battery 32 to electrical control system 34 when moved to the ON position so that the blower motor 36 may be powered by the battery 32.

The electrical control system 34 may include a printed circuit board (PCB) 44 having a plurality of discrete integrated circuits. The plurality of discrete integrated circuits provided on the PCB 44 of the electrical control system 34 may include, among other things, a DC-DC converter circuit 46, a battery alarm circuit 48, an analog motor control circuit 50, a pulse width modulation (PWM) motor control circuit 52, and a motor calibration circuit 54. Each of these circuits is described in greater detail herein.

The voltage level requirements of the blower motor 36 may be different from that supplied by the battery 32. The DC-DC converter circuit 46 may therefore be configured to adjust an input voltage from the battery 32 to a different output voltage that is compatible with the blower motor 36 of the blower assembly 22. The DC-DC converter circuit 46 may be adapted to select an output voltage that is optimized for powering the blower motor 36 in order to achieve a required airflow within the facepiece system 12 of the PAPR assembly 10.

In an embodiment, the DC-DC converter circuit 46 is a step-down buck converter circuit that is configured to decrease the input voltage from the battery 32 to a lower output voltage for powering the blower motor 36. In another embodiment, the DC-DC converter circuit 46 is a step-up boost converter that is configured to increase the input voltage from the battery 32 to a higher output voltage for powering the blower motor 36. Thus, the blower motor 36 could have either a lower or higher voltage level requirement compared to the battery 32 within the scope of this disclosure.

A faraday cage 68 may optionally be secured to the PCB 44 and positioned over top of the DC-DC converter circuit 46. The faraday cage 68 is configured to block electromagnetic fields that may emitted by the DC-DC converter circuit 46 and prevent radio frequency interference with external equipment.

The battery alarm circuit 48 is adapted to monitor the input voltage being supplied by the battery 32. More particularly, the battery alarm circuit 48 may compare the input voltage of the battery 32 to a predefined battery low voltage threshold. When the input voltage of the battery 32 is at or below the predefined battery low voltage threshold, the battery alarm circuit 48 may automatically activate a sound generating device 56 to emit an audible alert 58 for notifying a user 55 of the PAPR assembly 10 that the battery 32 needs charged and/or exchanged with another battery. The sound generating device 56 may include a speaker, a buzzer, a diaphragm, etc. The predefined battery low voltage threshold may be set at a level that allows for the user 55 to exit an area of potentially contaminated particulates, gases, and/or vapors and change the battery 32 while still meeting required minimum operating times established by required health standards.

The PCB 44 may optionally include a battery protection circuit 60 in addition to the battery alarm circuit 48. The battery protection circuit 60 is adapted to automatically shut-off the blower motor 36 of the blower assembly 22 when the input voltage of the battery 32 falls below a predefined battery voltage shutoff threshold. In an embodiment, the predefined battery voltage shutoff threshold is a different, lower voltage level than the predefined battery low voltage threshold associated with the battery alarm circuit 48.

In embodiments in which the battery protection circuit 60 is not provided, a jumper or stunt 70 may be provided on the PCB 44. The jumper or stunt 70 establishes a path around the depopulated location associated with the battery protection circuit 60.

Depending on the power requirements of the blower motor 36, a speed of the blower motor 36 may be controlled by either the analog motor control circuit 50 or the PWM motor control circuit 52 for delivering a required level of the filtered airflow 41 within the facepiece system 12 of the PAPR assembly 10. For example, when the blower motor 36 operates via analog signals, the analog motor control circuit 50 may be employed to control the speed of the blower motor 36. The analog motor control circuit 50 may control the output voltage delivered from the DC-DC converter circuit 46 to drive the blower motor 36 at a desired speed for achieving the required level of the filtered airflow 41 within the facepiece system 12.

Alternatively, when the blower motor 36 operates via digital pulse width modulation signals, the PWM motor control circuit 52 may be employed to control the speed of the blower motor 36. The PWM motor control circuit 52 may control the output voltage delivered from the DC-DC converter circuit 46 to drive the blower motor 36 at a desired speed for achieving the required level of the filtered airflow 41 within the facepiece system 12. The PWM motor control circuit 52 may control the speed of the blower motor 36 by outputting a series of ON/OFF pulses in the form of a square wave and varying the duty cycle (i.e., the pulse width or fraction of time that the output voltage is ON compared to when it is OFF) to select either a fixed motor speed or a fixed motor phase voltage that controls the speed of the blower motor 36 to deliver the required filtered airflow 41.

The motor calibration circuit 54 may include a potentiometer 62, or some other adjustable discrete component, for setting the desirable amount of filtered airflow 41 delivered during operation of the PAPR assembly 10. The potentiometer 62 may be adjusted with a suitable tool 72 during manufacturing (e.g., prior to product shipment) for adjusting and ultimately setting the airflow requirements of the PAPR assembly 10.

The PCB 44 may additionally include a current monitoring circuit 64. The current monitoring circuit 64 may include one or more sensors 66 that are configured for monitoring the current drawn by the blower motor 36 during its operation. Among other things, this allows the electrical control circuit 34 to determine whether the filtered airflow 41 being directed into the facepiece system 12 is below a desired airflow amount or to determine if the filter 24 is likely near its end of life and thus needs replaced.

As detailed above, the PCB 44 may include various discrete integrated circuits. Various alternative constructions of the PCB 44 and integrated circuits are also contemplated within the scope of this disclosure. For example, some or all of the discrete integrated circuits of the PCB 44 may be substituted with other discrete integrated circuits, or some sections of the PCB 44 may be depopulated (e.g., the battery protection circuit 60), in order to support a multitude of available off-the-shelf motors, circuits, batteries, switches, etc. for enabling the rapid production of the PAPR assembly 10.

Figure 3:
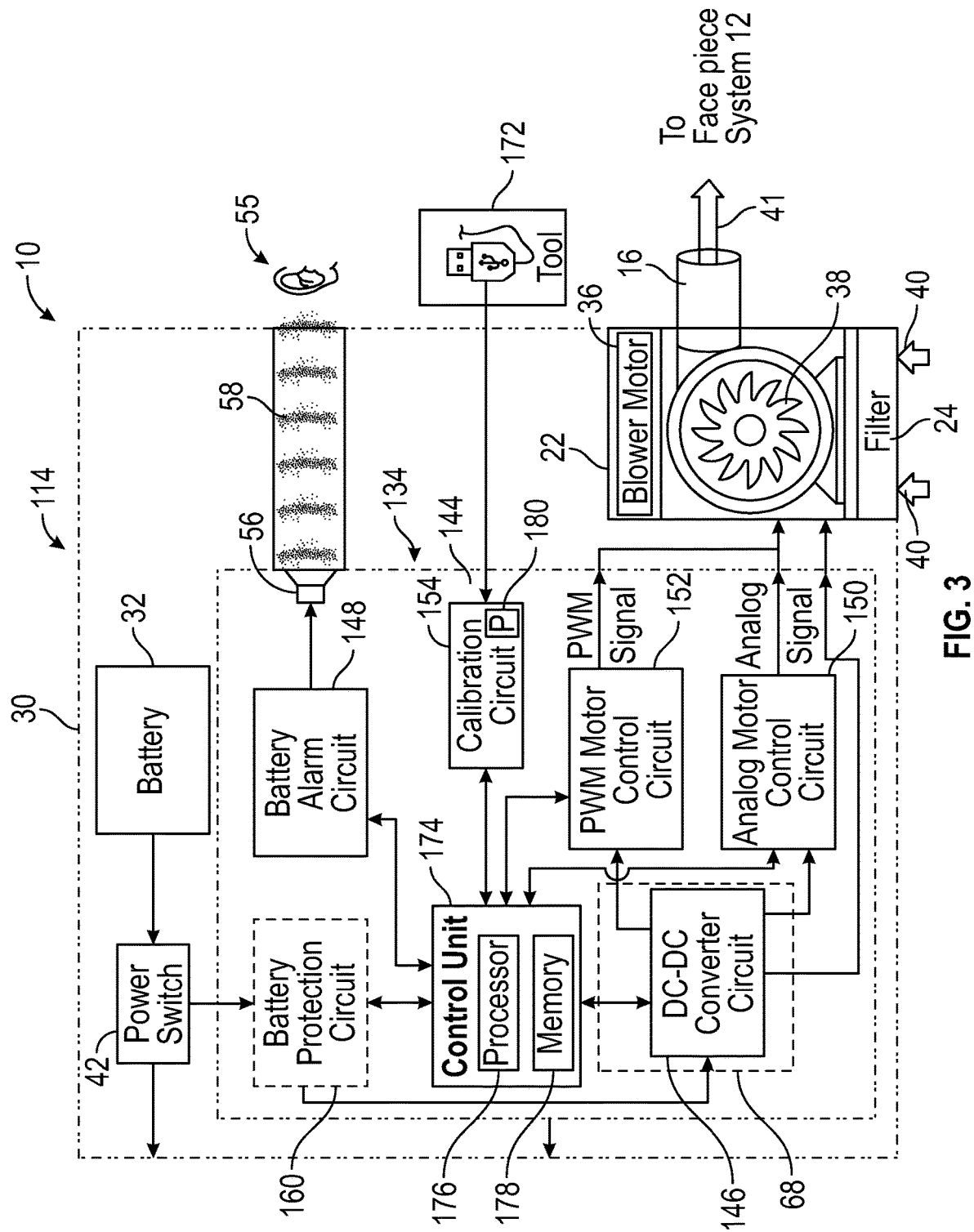
FIG. 3 is a block diagram of an electrical control system of a PAPR according to a second exemplary embodiment of this disclosure.

FIG. 3 is a block diagram that schematically depicts another exemplary filtration unit 114 for a PAPR assembly, such as the PAPR assembly 10 of FIG. 1, for example. The filtration unit 114 includes a slightly modified electrical control system 134 compared to the electrical control system 34 shown in FIG. 2.

The electrical control system 134 may include a printed circuit board (PCB) 144 having a plurality of discrete integrated circuits. The plurality of discrete integrated circuits provided on the PCB 144 of the electrical control system 134 may include, for example, a DC-DC converter circuit 146, a battery alarm circuit 148, an analog motor control circuit 150, a pulse width modulation (PWM) motor control circuit 152, a motor calibration circuit 154, and optionally, a battery protection circuit 160. Unless noted otherwise below, the respective functions of each of these discrete integrated circuits is similar to those described above with respect to the embodiment of FIG. 2.

The electrical control system 134 may additionally include a control unit 174 that is programmable for controlling the transfer of power within the filtration unit 114. The control unit 174 may be mounted to the PCB 144 and may include a processing unit 176 and non-transitory memory 178 for executing the various control strategies and modes of filtration unit 114. The control unit 174 may be configured to receive various inputs from the circuits of the electrical control system 134, analyze these inputs, and then command various operations of one or more of the circuits for controlling the transfer of power within the filtration unit 114.

The processing unit 176 of the control unit 174 is configured to execute one or more programs stored in the memory 178 of the control unit 174. In an embodiment, the processing unit 176 of the control unit 174 is programmed to control the DC-DC converter circuit 146 for delivering power from the battery 32 to the blower motor 36. In this way, the control unit 174 may select and provide feedback control of the operating voltage of the blower motor 36. A faraday cage 68 may optionally be secured to the PCB 144 over the DC-DC converter circuit 146 for protecting the DC-DC converter circuit 146 from external radio frequency interference.

In another embodiment, the processing unit 176 of the control unit 174 is programmed to control the battery alarm circuit 148 for monitoring the input voltage being supplied by the battery 32. The control unit 174 may selectively command activation of the sound generating device 56 to emit the audible alert 58 for notifying the user 55 that the battery 32 needs charged and/or exchanged with another battery when the input voltage of the battery 32 is at or below a predefined battery low voltage threshold. The control unit 174 may adjust and select the predefined battery low voltage threshold for notifying the user 55 of a low battery condition.

In another embodiment, the processing unit 176 of the control unit 174 is programmed to control the battery protection circuit 160 for optionally further monitoring the input voltage supplied by the battery 32. The control unit 174 may automatically command the blower motor 36 of the blower assembly 22 to shut-off when the input voltage of the battery 32 falls below a predefined battery voltage shutoff threshold. The control unit 174 may adjust and select the predefined battery voltage shutoff threshold for turning off the blower motor 36 and/or the sound generating device 56.

In another embodiment, the processing unit 176 of the control unit 174 is programmed to control the analog motor control circuit 150 for modifying the speed of the blower motor 36 when the blower motor 36 operates via analog signals. The control unit 174 may control the analog motor control circuit 150 for setting the voltage output from the DC-DC converter circuit 146 to drive the blower motor 36 at a desired speed for achieving the required level of the filtered airflow 41 within the facepiece system 12.

In another embodiment, the processing unit 176 of the control unit 174 is programmed to control the PWM motor control circuit 152 for controlling the speed of the blower motor 36 when the blower motor 36 operates via digital PWM signals. The control unit 174 may control the duty cycle of the PWM motor control circuit 152 for driving the blower motor 36 at a desired speed for achieving the required level of the filtered airflow 41 within the facepiece system 12.

In yet another embodiment, the processing unit 176 of the control unit 174 is programmable for setting the proper analog voltage or PWM output for controlling the blower motor 36 at a desired speed for achieving the required level of the filtered airflow 41 within the facepiece system 12. In this regard, the motor calibration circuit 154 may include a port 180, such as a USB port or other suitable connector, for setting the proper analog voltage/PWM output. The control unit 174 may be programmed during manufacturing using a tool 172, such as a computer, that can be electrically connected to the control unit 174 via the port 180.

The exemplary PAPR assemblies described herein employ electrical control and power supply systems that can support a multitude of off-the-shelf components (e.g., motors, integrated circuits, batteries, switches, etc.) for enabling the rapid production of PAPR devices. The flexibility afforded by the exemplary electrical control and power supply systems of this disclosure alleviates many of the complexities associated with supply chain constraints. PAPRs may therefore be rapidly and efficiently produced, such as during a pandemic, in order to quickly supply healthcare workers with necessary personal protective equipment.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A powered air-purifying respirator (PAPR) assembly, comprising:
a battery;
a blower assembly including a blower motor powered by the battery;
a DC-DC converter circuit configured to modify an input voltage from the battery to an output voltage that is compatible with the blower motor;
a pulse width modulation (PWM) motor control circuit;
an analog motor control circuit; and
a control unit comprising a processor and memory, wherein the control unit is programmed to control voltage to the DC-DC converter circuit to further control an input voltage to be supplied to either the PWM motor control circuit or the analog motor control circuit to control a speed of the blower assembly.

2. The PAPR assembly as recited in claim 1, wherein the DC-DC converter circuit is a step-down buck converter circuit configured to reduce the input voltage.

3. The PAPR assembly as recited in claim 1, wherein the DC-DC converter is a step-up boost converter configured to increase the input voltage.

4. The PAPR assembly as recited in claim 1, wherein the analog motor control circuit and the PWM motor control circuit are discrete integrated circuits of a printed circuit board of a filtration unit of the PAPR assembly.

5. The PAPR assembly as recited in claim 1, comprising a battery alarm circuit adapted to monitor the input voltage from the battery.

6. The PAPR assembly as recited in claim 5, wherein the battery alarm circuit includes a sound generating device that is actuated in response to the input voltage falling below a predefined battery low voltage threshold.

7. The PAPR assembly as recited in claim 6, comprising a battery protection circuit configured to automatically shut-off the blower motor when the input voltage of the battery falls below a predefined battery voltage shutoff threshold.

8. The PAPR assembly as recited in claim 7, wherein the predefined battery voltage shutoff threshold is a different, lower voltage than the predefined battery low voltage threshold.

9. The PAPR assembly as recited in claim 1, comprising a current monitoring circuit configured to monitor a current draw of the blower motor.

10. The PAPR assembly as recited in claim 1, comprising a motor calibration circuit configured for adjusting an airflow setting of the PAPR assembly.

11. The PAPR assembly as recited in claim 1, wherein the battery is a retail grade rechargeable lithium-ion battery, and the blower assembly is a repurposed automotive component.

12. The PAPR assembly as recited in claim 11, wherein the repurposed automotive component is a seat blower motor assembly for a heated and/or cooled vehicle interior seat.

13. The PAPR assembly as recited in claim 1, comprising a faraday cage positioned over the DC-DC converter circuit and configured to protect the DC-DC converter circuit from external radio frequency interference.

14. A powered air-purifying respirator (PAPR) assembly, comprising:
a filtration unit housing;
an electrical control system housed within the filtration unit housing and including an analog motor control circuit and a pulse width modulation (PWM) motor control circuit;
a blower assembly including a blower motor housed within the filtration unit housing;
a DC-DC converter circuit; and
a control unit comprising a processor and memory, wherein the control unit is programmed to control voltage to the DC-DC converter circuit to further control an input voltage to be supplied to either the PWM motor control circuit or the analog motor control circuit to control a speed of the blower assembly,
wherein the speed of the blower motor is controlled by the analog motor control circuit when the blower motor operates via analog control signals,
wherein the speed of the blower motor is controlled by the PWM motor control circuit when the blower motor operates via digital pulse width modulation signals.

15. The PAPR assembly as recited in claim 14, comprising a facepiece system connected to the filtration unit housing by a tube.

16. The PAPR assembly as recited in claim 14, wherein the DC-DC converter circuit is configured to modify an input voltage from a battery to an output voltage that is compatible with the blower motor.

17. The PAPR assembly as recited in claim 14, wherein the electrical control system includes a battery alarm circuit having a sound generating device that is actuated in response to an input voltage of a battery falling below a predefined battery low voltage threshold.

18. A powered air-purifying respirator (PAPR) assembly, comprising:
a filtration unit housing;
an electrical control system housed within the filtration unit housing and including both an analog motor control circuit and a pulse width modulation (PWM) motor control circuit;
a motor vehicle seat blower motor assembly including a blower motor housed within the filtration unit housing;
a DC-DC converter circuit configured to modify an input voltage from a battery to an output voltage that is compatible with the blower motor;
a control unit comprising a processor and a memory, the control unit programmed to control the analog motor control circuit or the PWM motor control circuit for controlling a speed of the blower motor,
wherein the control unit is programmed to control voltage to the DC-DC converter circuit to further control an input voltage to be supplied to either the PWM motor control circuit or the analog motor control circuit to control the speed of the blower assembly,
wherein the control unit is programmed to control the speed of the blower motor with the analog motor control circuit when the blower motor operates via analog control signals,
wherein the control unit is programmed to control the speed of the blower motor with the PWM motor control circuit when the blower motor operates via digital pulse width modulation signals,
wherein the control unit is further programmed to control the DC-DC converter circuit for delivering power from the battery to the blower motor,
wherein each of the analog motor control circuit, the PWM motor control circuit, the DC-DC converter circuit, and the control unit are mounted to a printed circuit board of the electrical control system.

19. The PAPR assembly as recited in claim 18, comprising a faraday cage positioned over the DC-DC converter circuit and configured to protect the DC-DC converter circuit from external radio frequency interference.

* * * * *